United States Patent
Parazynski et al.

(10) Patent No.: US 11,194,358 B2
(45) Date of Patent: *Dec. 7, 2021

(54) MULTI-AXIS GIMBAL MOUNTING FOR CONTROLLER PROVIDING TACTILE FEEDBACK FOR THE NULL COMMAND

(71) Applicant: Fluidity Technologies Inc., Houston, TX (US)

(72) Inventors: Scott Edward Parazynski, Houston, TX (US); Jeffrey William Bull, Naperville, IL (US); Nicholas Michael Degnan, Redondo Beach, CA (US); Alina Mercedes Matson, Chaska, MN (US); Brandon Tran, Lumberton, NJ (US)

(73) Assignee: Fluidity Technologies Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,202

(22) Filed: Apr. 24, 2020

(65) Prior Publication Data
US 2020/0393865 A1    Dec. 17, 2020

Related U.S. Application Data

(63) Continuation of application No. PCT/US2018/057864, filed on Oct. 26, 2018, which
(Continued)

(51) Int. Cl.
*G05G 5/03*    (2008.04)
*G05G 1/015*    (2008.04)
(Continued)

(52) U.S. Cl.
CPC .............. *G05G 5/03* (2013.01); *G05G 1/015* (2013.01); *G05G 1/04* (2013.01); *G05G 5/05* (2013.01);
(Continued)

(58) Field of Classification Search
CPC    G05G 5/03; G05G 1/015; G05G 1/04; G05G 5/05; G05G 9/047;
(Continued)

(56) References Cited

U.S. PATENT DOCUMENTS 3,028,126 A    4/1962    Holleman
3,260,826 A    7/1966    Johnson
(Continued)

FOREIGN PATENT DOCUMENTS

CN    1310366 A    8/2001
CN    102346498 A    2/2012
(Continued)

OTHER PUBLICATIONS

Office Action for U.S. Appl. No. 13/797,184, dated Mar. 2, 2015, 16 pages.
(Continued)

*Primary Examiner* — Charles V Hicks
(74) *Attorney, Agent, or Firm* — Cooley LLP

(57) ABSTRACT

A gimbal support that senses rotational displacement and provides haptic feedback in one, two or three dimensions of a manually-operated control member used to generate control inputs using a single hand while also limiting cross-coupling.

21 Claims, 12 Drawing Sheets

Related U.S. Application Data is a continuation of application No. 16/163,561, filed on Oct. 17, 2018, now Pat. No. 10,324,487, which is a continuation-in-part of application No. 16/114,190, filed on Aug. 27, 2018, now Pat. No. 10,198,086, which is a continuation-in-part of application No. 15/964,064, filed on Apr. 26, 2018, now Pat. No. 10,520,973, which is a continuation-in-part of application No. 15/796,744, filed on Oct. 27, 2017, now Pat. No. 10,664,002.

(51) Int. Cl.
  *G05G 1/04* (2006.01)
  *G05G 5/05* (2006.01)
  *G05G 9/047* (2006.01)

(52) U.S. Cl.
  CPC ... *G05G 9/047* (2013.01); *G05G 2009/04718* (2013.01); *G05G 2009/04733* (2013.01); *G05G 2505/00* (2013.01)

(58) Field of Classification Search
  CPC .......... G05G 2009/04718; G05G 2009/04733; G05G 2505/00
  See application file for complete search history.

(56) References Cited

U.S. PATENT DOCUMENTS

| | | |
|---|---|---|
| 4,012,014 A | 3/1977 | Marshall |
| 4,216,467 A | 8/1980 | Colston |
| 4,306,208 A | 12/1981 | Coors |
| 4,420,808 A | 12/1983 | Diamond et al. |
| 4,584,510 A | 4/1986 | Hollow |
| 4,590,339 A | 5/1986 | Scott-Jackson et al. |
| 4,733,214 A | 3/1988 | Andresen |
| 5,042,314 A | 8/1991 | Rytter et al. |
| 5,127,608 A | 7/1992 | Farineau et al. |
| 5,128,671 A | 7/1992 | Thomas, Jr. |
| 5,223,776 A | 6/1993 | Radke et al. |
| 5,317,301 A | 5/1994 | DeVolpi |
| 5,459,382 A | 10/1995 | Jacobus et al. |
| 5,503,040 A | 4/1996 | Wright |
| 5,559,432 A | 9/1996 | Logue |
| 5,565,891 A | 10/1996 | Armstrong |
| D375,765 S | 11/1996 | Kawasaki |
| 5,607,158 A | 3/1997 | Chan |
| 5,617,515 A | 4/1997 | MacLaren et al. |
| 5,643,087 A | 7/1997 | Marcus et al. |
| 5,687,080 A | 11/1997 | Hoyt et al. |
| 5,694,153 A | 12/1997 | Aoyagi et al. |
| D389,198 S | 1/1998 | Hama |
| 5,749,577 A | 5/1998 | Couch et al. |
| 5,781,180 A | 7/1998 | Couch et al. |
| 5,831,408 A | 11/1998 | Jacobus et al. |
| 5,963,196 A | 10/1999 | Nishiumi et al. |
| H1822 H | 12/1999 | Kelley et al. |
| 6,024,576 A | 2/2000 | Bevirt et al. |
| 6,068,554 A | 5/2000 | Tyler |
| 6,198,471 B1 | 3/2001 | Cook |
| 6,201,196 B1 | 3/2001 | Wergen |
| 6,222,525 B1 | 4/2001 | Armstrong |
| 6,429,849 B1 | 8/2002 | An et al. |
| 6,459,420 B1 | 10/2002 | Harris |
| 6,580,418 B1 | 6/2003 | Grome et al. |
| 6,597,347 B1 | 7/2003 | Yasutake |
| 6,613,997 B2 | 9/2003 | Oster et al. |
| 6,614,420 B1 | 9/2003 | Han et al. |
| 6,624,806 B2 | 9/2003 | Hsu |
| 6,644,141 B2 | 11/2003 | Oikarinen |
| 6,664,946 B1 | 12/2003 | Stipes et al. |
| 6,865,342 B2 | 3/2005 | Hirata et al. |
| 7,131,389 B1 | 11/2006 | Hawkes |
| 7,170,420 B2 | 1/2007 | Phifer |
| 7,548,697 B2 | 6/2009 | Hudson et al. |
| 7,575,491 B1 | 8/2009 | Martin |
| 7,793,890 B2 | 9/2010 | Scherer |
| 7,823,685 B2 | 11/2010 | Blind |
| 7,931,239 B2 | 4/2011 | Pedersen et al. |
| 8,089,225 B2 | 1/2012 | Goossen |
| 8,100,218 B2 | 1/2012 | Case et al. |
| 8,217,770 B2 | 7/2012 | Obourn et al. |
| 8,258,917 B2 | 9/2012 | Cai et al. |
| 8,276,476 B2 | 10/2012 | Diccion |
| 8,300,012 B2 | 10/2012 | Yamamoto |
| 8,344,914 B2 | 1/2013 | Yen |
| 8,345,004 B1 | 1/2013 | Kass et al. |
| 8,371,187 B2 | 2/2013 | Payandeh et al. |
| 8,380,402 B2 | 2/2013 | Hobenshield |
| D678,281 S | 3/2013 | Yung |
| 8,471,815 B2 | 6/2013 | Jaouen |
| 8,576,168 B2 | 11/2013 | Kabasawa et al. |
| 8,716,973 B1 | 5/2014 | Lammertse |
| 8,866,597 B2 | 10/2014 | Brendel |
| 8,881,616 B2 | 11/2014 | Dize et al. |
| 8,887,597 B2 | 11/2014 | Black |
| 9,501,084 B1 | 11/2016 | Bannister |
| 9,504,912 B2 | 11/2016 | Ikeda et al. |
| 9,547,380 B2 | 1/2017 | Parazynski |
| 9,727,076 B2 | 8/2017 | Smith |
| 10,133,271 B2 | 11/2018 | Hutson |
| 10,152,853 B2 | 12/2018 | Provancher et al. |
| 10,198,086 B2 | 2/2019 | Parazynski et al. |
| 10,222,794 B2 | 3/2019 | Deng et al. |
| 10,324,487 B2 | 6/2019 | Parazynski et al. |
| 10,324,540 B1 | 6/2019 | Parazynski |
| 10,331,232 B2 | 6/2019 | Parazynski et al. |
| 10,331,233 B2 | 6/2019 | Parazynski et al. |
| 10,481,704 B2 | 11/2019 | Parazynski et al. |
| 10,520,973 B2 | 12/2019 | Parazynski et al. |
| 10,664,002 B2 | 5/2020 | Parazynski |
| 10,921,904 B2 | 2/2021 | Parazynski et al. |
| 2002/0128064 A1 | 9/2002 | Sobota |
| 2002/0148715 A1 | 10/2002 | Oster et al. |
| 2003/0006956 A1 | 1/2003 | Wu et al. |
| 2003/0058219 A1 | 3/2003 | Shaw |
| 2003/0214484 A1 | 11/2003 | Haywood |
| 2004/0083940 A1 | 5/2004 | Shelton et al. |
| 2005/0104742 A1 | 5/2005 | Phifer |
| 2005/0159850 A1 | 7/2005 | Melman |
| 2005/0277470 A1 | 12/2005 | Watanachote |
| 2006/0137931 A1 | 6/2006 | Berg et al. |
| 2006/0156848 A1 | 7/2006 | Gosselin et al. |
| 2006/0164383 A1 | 7/2006 | Machin et al. |
| 2006/0224280 A1 | 10/2006 | Flanigan et al. |
| 2006/0262000 A1 | 11/2006 | Strong |
| 2007/0080934 A1 | 4/2007 | Chen et al. |
| 2007/0156286 A1 | 7/2007 | Yarnauchi |
| 2008/0063400 A1 | 3/2008 | Hudson et al. |
| 2008/0132334 A1 | 6/2008 | Nonaka et al. |
| 2008/0174550 A1 | 7/2008 | Laurila et al. |
| 2008/0217147 A1 | 9/2008 | Martin |
| 2008/0278448 A1 | 11/2008 | Nilsagard et al. |
| 2009/0084214 A1 | 4/2009 | Sakai et al. |
| 2009/0152782 A1 | 6/2009 | Larson et al. |
| 2009/0179869 A1 | 7/2009 | Slotznick |
| 2009/0213073 A1 | 8/2009 | Obermeyer et al. |
| 2009/0248220 A1 | 10/2009 | Ecton et al. |
| 2010/0097309 A1 | 4/2010 | Nishida et al. |
| 2010/0302017 A1 | 12/2010 | Guglielmo |
| 2011/0088961 A1 | 4/2011 | Case et al. |
| 2011/0148667 A1 | 6/2011 | Yeh |
| 2011/0213384 A1 | 9/2011 | Jeong |
| 2011/0219899 A1 | 9/2011 | Dize et al. |
| 2012/0152052 A1 | 6/2012 | Suzuki |
| 2012/0187238 A1 | 7/2012 | Lam |
| 2012/0249455 A1 | 10/2012 | Nagata et al. |
| 2013/0147611 A1 | 6/2013 | Brendel |
| 2013/0178293 A1 | 7/2013 | Nakayama et al. |
| 2013/0293362 A1 | 11/2013 | Parazynski |
| 2014/0083225 A1 | 3/2014 | Downs et al. |
| 2014/0247119 A1 | 9/2014 | Robbins et al. |
| 2014/0249695 A1 | 9/2014 | Gettings et al. |

(56) References Cited

U.S. PATENT DOCUMENTS

| | | |
|---|---|---|
| 2015/0253801 A1 | 9/2015 | Wuisan et al. |
| 2016/0077589 A1 | 3/2016 | Chataignier et al. |
| 2016/0195939 A1 | 7/2016 | Parazynski |
| 2016/0241767 A1 | 8/2016 | Cho et al. |
| 2017/0121000 A1 | 5/2017 | Forslund et al. |
| 2017/0133175 A1 | 5/2017 | Lin et al. |
| 2017/0175884 A1 | 6/2017 | Watanabe |
| 2017/0233983 A1 | 8/2017 | Wright |
| 2017/0246533 A1 | 8/2017 | LaChappell et al. |
| 2017/0269587 A1 | 9/2017 | Hong |
| 2018/0164799 A1 | 6/2018 | Hong |
| 2018/0356907 A1 | 12/2018 | Parazynski et al. |
| 2019/0025869 A1 | 1/2019 | Parazynski |
| 2019/0033987 A1 | 1/2019 | Parazynski et al. |
| 2019/0041891 A1 | 2/2019 | Parazynski et al. |
| 2019/0041894 A1 | 2/2019 | Parazynski et al. |
| 2019/0042003 A1 | 2/2019 | Parazynski et al. |
| 2019/0042004 A1 | 2/2019 | Parazynski et al. |
| 2019/0071167 A1 | 3/2019 | Selwa et al. |
| 2019/0243468 A1 | 8/2019 | Parazynski et al. |
| 2020/0285326 A1 | 9/2020 | Parazynski et al. |
| 2020/0387238 A1 | 12/2020 | Parazynski et al. |
| 2020/0387239 A1 | 12/2020 | Parazynski et al. |
| 2021/0011561 A1 | 1/2021 | Parazynski et al. |
| 2021/0173391 A1 | 6/2021 | Parazynski et al. |

FOREIGN PATENT DOCUMENTS

| | | |
|---|---|---|
| CN | 102824746 A | 12/2012 |
| CN | 108885452 A | 11/2018 |
| DE | 102015102317 A1 | 8/2016 |
| EP | 1621954 B1 | 7/2011 |
| GB | 2091423 A | 7/1982 |
| JP | H11-154031 | 6/1999 |
| WO | WO 2007/055606 | 5/2007 |
| WO | WO-2019122926 A1 | 6/2019 |

OTHER PUBLICATIONS

Office Action for U.S. Appl. No. 13/797,184, dated Oct. 16, 2015, 15 pages.

Office Action for U.S. Appl. No. 15/071,624, dated May 17, 2016, 20 pages.

Office Action for U.S. Appl. No. 15/394,490, dated Nov. 21, 2018, 10 pages.

Office Action for U.S. Appl. No. 16/682,509, dated Jul. 20, 2020, 11 pages.

Office Action for U.S. Appl. No. 15/796,744, dated Dec. 21, 2018, 8 pages.

Office Action for U.S. Appl. No. 15/796,744, dated Aug. 7, 2019, 21 pages.

First Office Action for Chinese Application No. 201780080619.X, dated Mar. 16, 2020, 15 pages.

International Search Report and Written Opinion for International Application No. PCT/US2017/058905, dated Feb. 23, 2018, 5 pages.

Office Action for U.S. Appl. No. 15/964,064, dated Mar. 18, 2019, 11 pages.

International Search Report and Written Opinion for International Application No. PCT/US2018/057862, dated Jan. 11, 2019, 15 pages.

Office Action for U.S. Appl. No. 16/163,561, dated Dec. 11, 2018, 13 pages.

International Search Report and Written Opinion for International Application No. PCT/US2018/057864, dated Feb. 26, 2019, 14 pages.

Office Action for U.S. Appl. No. 16/163,563, dated Dec. 12, 2018, 22 pages.

International Search Report and Written Opinion for International Application No. PCT/US2018/057865, dated Jan. 4, 2019, 10 pages.

Office Action for U.S. Appl. No. 16/163,565, dated Dec. 19, 2018, 39 pages.

International Search Report and Written Opinion for International Application No. PCT/US2018/057874, dated Jan. 10, 2019, 10 pages.

"Feel Your Drone With MotionPilot's Haptic Joystick", Engadget, https://www.engadget.com/2018/01/19/motionpilothaptic-drone-joystick/, dated Jan. 19, 2018.

"CES 2018: TIE Develop World's First One-Hand Drone Controller System," Live At PC.com, https://liveatpc.com/ces-2018-tie-develops-worlds-first-one-hand-drone-controller-system/, dated Jan. 2018.

"[Review] JJRC H37 Baby Elfie: Is it a Worthy Successor?" DronesGlobe, http://www.dronesglobe.com/review/baby-elfie/, dated Oct. 7, 2017.

"Learn How to Pilot in Less Than 2 Minutes", Wepulsit, http://www.wepulsit.com/, dated 2017.

"InnovRC Firmware v1.2", InnovRC, http://www.innovrc.de/ivrcwiki/index.php?title=Hauptseite, dated Mar. 2013.

"H.E.A.R.T.—Hall Effect Accurate Technology: A Unique 3D Technological Innovation Built Into the New Thrustmaster Joystick," Thrustmaster, http://www.thrustmaster.com/press/heart-hall-effect-accurate-technology-unique-3d-technological-innovation-built-new-thrustmaste, dated Jan. 7, 2009.

Pamplona, V. F. et al., "The image-based data glove," Proceedings of the 10th Symposium on Virtual and Augmented Reality, (SVR'2008), Joao Pessoa, Brazil, 2008, 204-211.

Wilbert, J. et al., "Semi-robotic 6 degree of freedom positioning for intracranial high precision radiotherapy; first phantom and clinical results," Radiation Oncology, 5(42), 11 pages, May 26, 2010.

Zhai, X., "Human performance in six degree of freedom input control," Doctoral Dissertation University of Toronto, Graduate Department of Industrial Engineering, 179 pages, 1995.

Extended European Search Report for European Application No. 17865929.8, dated Nov. 13, 2020, 9 pages.

Office Action for U.S. Appl. No. 16/858,212, dated Jan. 29, 2021, 7 pages.

Office Action for U.S. Appl. No. 16/858,217, dated Feb. 3, 2021, 7 pages.

Office Action for U.S. Appl. No. 17/110,576, dated Jan. 29, 2021, 25 pages.

Office Action for U.S. Appl. No. 16/682,509, dated Mar. 16, 2021, 26 pages.

Extended European Search Report for European Application No. 18870040.5, dated Jun. 25, 2021, 9 pages.

First Office Action for Chinese Application No. 201880083427.9, dated Jun. 28, 2021, 13 pages.

International Search Report and Written Opinion for International Application No. PCT/US2020/063577, dated Apr. 14, 2021, 9 pages.

Partial Supplementary European Search Report for European Application No. 18871801.9, dated May 27, 2021, 15 pages.

Extended European Search Report for European Application No. 18871150.1, dated Aug. 19, 2021, 10 pages.

MULTI-AXIS GIMBAL MOUNTING FOR CONTROLLER PROVIDING TACTILE FEEDBACK FOR THE NULL COMMAND

CROSS-REFERENCE TO RELATED APPLICATIONS

This application is a continuation of International Patent Application No. PCT/US2018/057864, filed on Oct. 26, 2018, which is a continuation of U.S. patent application Ser. No. 16/163,561, filed on Oct. 17, 2018, now U.S. Pat. No. 10,324,487, which is a continuation-in-part of U.S. patent application Ser. No. 16/114,190, filed on Aug. 27, 2018, now U.S. Pat. No. 10,198,086, which is a continuation-in-part of U.S. patent application Ser. No. 15/964,064, filed on Apr. 26, 2018, now U.S. Pat. No. 10,520,973, which is a continuation-in-part of U.S. patent application Ser. No. 15/796,744, filed on Oct. 27, 2017, now U.S. Pat. No. 10,664,002, each of which is incorporated herein by reference in its entirety.

FIELD OF THE INVENTION

The present disclosure relates to user input devices with haptic feedback that are displaced manually by an operator to generate control input.

BACKGROUND OF THE INVENTION

Input devices or controllers, such as joysticks, control columns, cyclic sticks, and foot pedals generate control inputs for a real or virtual target by sensing movement of one or more control members by a person that is commanding or controlling movement and operation of the target. These types of controllers have been used to control inputs for parameters such as control pitch, yaw, and roll of the target, as well as navigational parameters such as translation (e.g., x-, y-, and z-axis movement) in a three-dimensional (3D) space, velocity, acceleration, and/or a variety of other command parameters. Examples of targets that can be controlled include an aircraft, submersible vehicles, spacecraft, industrial cranes, robotic surgical instruments, a control target in a virtual environment such as a computer game or virtual or augmented reality environments, and/or a variety of other control targets as may be known by one or more of ordinary skill in the art.

U.S. patent application Ser. Nos. 13/797,184 and 15/071,624, which are each incorporated herein by reference in their entireties, describe several embodiments of a control system that can be configured to permit a user to use a single hand to generate control inputs in more than three, and up to six, degrees of freedom (6-DoF), simultaneously and independently using a control that can be manipulated using a single hand. Various aspects of the single-handled controllers described in this application, individually and/or in combination with other of these aspects, better enable users, whether they are in motion or at rest (such as a computer augmented or virtual reality gamers, pilots, hikers, skiers, security/SAR personnel, war-fighters, and others, for example) to control an asset or target in physical and/or virtual three-dimensional space, by enabling generation of control inputs while also limiting cross-coupling (unintended motions). A controller with these features can be used to allow the controller to decouple translation from attitude adjustments in the control requirements of computer aided design, drone flight, various types of computer games, virtual and augmented reality and other virtual and physical tasks where precise movement through space is required.

SUMMARY

When operating a drone, for example, the zero input positions of the controller that control the drone along the x, y, and z axes and to yaw (rotate about the z axis) should be always known. Other flight regimes, such as virtual and augmented reality, computer gaming and surgical robotics may require control inputs for as many as six independent degrees of freedom simultaneously: translation along x, y, and z axes, and pitch, yaw, and roll (rotation about the three axes). Knowing the location of the "zero input" for each degree of freedom of the control member or controller independently and at the same time for a controller that moves a point of reference (POR) through physical or virtual space allows for more intuitive control. However, for drone flight and virtual and augmented reality systems the problem is compounded by the need to maintain precise control of the point of reference while the pilot or person displacing or deflecting the controller to generate control inputs to the target is physically moving at the same time.

Described below are representative examples of various embodiments of gimbal supports for a manually displaceable control member or input for controller disclosing certain features that can be used either by themselves, in combinations with each other, or in other combinations, to address these problems. Such features may also be useful in providing solutions for other problems.

In one embodiment, the gimbal support allows the control member to be pivoted about two or more intersecting axes while also allowing for accurate measurement of the angular displacement of the control member about each of the axes. In an alternative embodiment, the gimbal support may incorporate one or more locks for selectively preventing displacement of the control member in one or more degrees of freedom (either temporarily or permanently) while continuing to allow for displacement in one or more degrees of freedom for purposes of adapting the gimbal support for other applications.

In another embodiment, a gimbal support informs with a force, haptic, or tactile feedback a user who is manually manipulating a control member of when the control member is in a zero command or null position (one in which there is no control input to the target) in at least one degree of freedom.

In yet another embodiment, the mounting may, optionally, also enable the control member to be rotated about a third axis that is mutually orthogonal to the other two axes with a centering mechanism that informs the user of zero or null command for a third degree of freedom. In one example, mechanical detents are used to define a center or "zero" input for each of the multiple degrees of freedom of one or more of the controllers and cause the user to feel a slight increase in force as the controller member departs from the center or "zero input" position. When re-entering the center of the range of travel of a controller member along one of the degrees of freedom of movement, a slight change in force is felt as "zero input" is restored. These detent forces can be felt in the user's hands, simultaneously and independently for each degree of freedom being commanded. Other examples may substitute magnets for one or more of the detents.

Optionally, a second control member on the first control member can be mounted on the first control member and displaced with respect to the first control member in one, two or three degrees of freedom along one or more of the axes of an x, y and z cartesian coordinate system with respect to the first control member in order to generate control signals in up to 3 additional degrees of freedom, also with tactile feedback of zero command in one, two or three degrees of freedom. Placing the second control member in a position in which it is capable of being displaced with a thumb or another digit of the same hand that is gripping the first control member enables construction of a controller that is, structurally, capable of being displaced in 4, 5 or 6 degrees of freedom (or, alternatively, a controller that is structurally capable of being displaced in 6 degrees of freedom but with one or more degrees of freedom lockable or not programmed to generate control inputs, depending on the application) and generates a control input for each degree of freedom while preserving the ability of a user to receive tactile feedback when there is an excursion of the first member from the zero input position of any given degree of freedom, independently and simultaneously.

Additional aspects, advantages, features and embodiments are described below in conjunction with the accompanying drawings.

BRIEF DESCRIPTION OF THE DRAWINGS

For promoting an understanding of the principles of the invention that is claimed below, reference will now be made to the embodiments, or examples, illustrated in the appended drawings. It will be understood that, by describing specific embodiments and examples, no limitation of the scope of the invention, beyond the literal terms set out in the claims, is intended. Alterations and further modifications to the described embodiments and examples are possible while making use of the claimed subject matter, and therefore are contemplated as being within the scope of the invention as claimed.

DESCRIPTION OF ILLUSTRATIVE EMBODIMENTS

Figure 1:
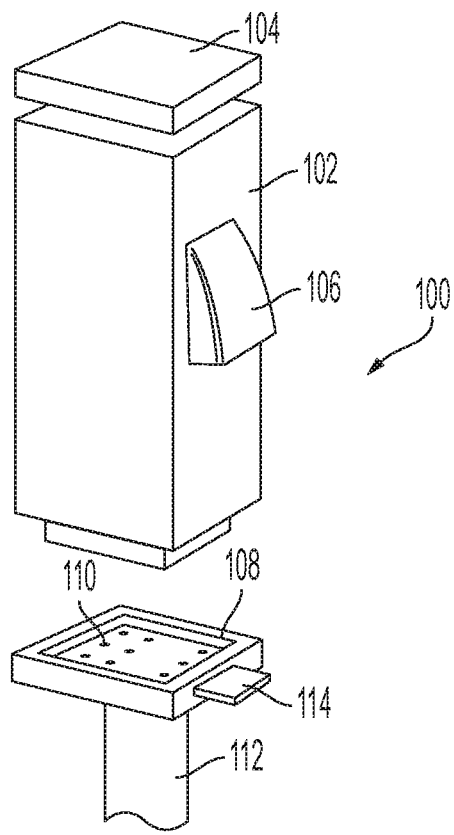
FIG. 1 is a schematic representation of a connector for attaching and detaching a hand controller to base.

In the drawings and description that follows, the drawings are not necessarily to scale. Certain features of the invention may be shown in schematic form. Details or presence of conventional or previously described elements may not be shown in a figure in the interest of clarity and conciseness. All patents, patent applications, articles, other publications, documents and things referenced herein are hereby incorporated by reference in their entirety for all purposes. To the extent of any inconsistency or conflict in the definition or use of terms between any of the incorporated publications, documents or things and the present application, those of the present application prevail.

The present disclosure describes several embodiments of controllers with a control member that a user moves to control, using a single hand, a control target or point of reference (POR). Each of these embodiments are representative, non-limiting examples of controllers with a control member supported by a gimbal support and pivoted or rotated in one, two or three degrees of freedom by a hand of an operator or user to generate a control input for each degree of freedom. The gimbal support also acts as a sensor to detect and measure displacement from a null position of the control member. Preferably, the sensor generates a set of signals, one for each degree of freedom of movement, independently of the movement in the other degrees of freedom of movement. Each of these signals are then used to generate control inputs that are transmitted to a target control system. The controller maps the sensor signals to predetermined control inputs. The mapping can be, in one embodiment, changed or programmed so that the signal from any degree of freedom being commanded with the controller can be mapped to any control input for the target.

Some examples of controllers have a control member mounted to a base, which can be mounted on a platform, held by hand, or worn by the user. The base acts as a frame of reference for measuring displacement of the first control member of the controller. The base may, in some embodiments, also house signal conditioning circuits for interfacing sensors for measuring displacement, a processor for running software programmed processes, such as those described herein, a battery or other source for power, interfaces for other hardware, and optionally transmitters and receivers for wireless communication.

A non-limiting, representative example of a controller is a mobile, two-handed controller system. A two-handed controller provides a consistent, known reference frame (stabilized by the user's other hand) even while moving, e.g., walking, skiing, running, driving. For certain types of applications, for example inspection, security and cinematographic drone missions, a hand controller may be mounted to a tripod or other physical structure, else on a platform that can be held or otherwise stabilized by the user's other hand. The platform may include secondary controls and, if desired, a display unit. In one example, all 6 degrees of freedom (DOF) inputs of a controller having first control member with 3-DOF of movement and a second control member mounted to it with an additional 3-DOF of movement, can be reacted through the platform. With such an arrangement, this example of a control system facilitates movement through the air like a fighter pilot with intuitive (non-deliberate cognitive) inputs.

Control members contemplated for use with the embodiments and examples of a gimbal support disclosed herein may have a centering mechanism for a control member in at least one degree of freedom in one embodiment, at least two degrees of freedom in another embodiment, and at least three degrees of freedom in yet another embodiment to give the user a sense of "zero" or null command. When a control member is displaced along one of the degrees of freedom, one embodiment of the gimbal support generates a tactile feedback, such as a mechanical force (generated, for example, by a spring or a detent), a shake or another type of haptic signal, on the control members to return them to a position for zero input (the zero position).

The communication of force and position provides a comfortable dynamic balance. Moving any point of reference through physical or virtual space by way of a hand controller benefits from constant insight into displacement in every degree of freedom being controlled. For example, knowing where "zero input" is at all times for movement along the x, y and z axes and yaw for a drone assists with operating the drone. Other flight regimes, such as virtual and augmented reality, computer gaming and surgical robotics may require as many as six independent degrees of freedom simultaneously (x, y, z, pitch, yaw, roll). The gimbal supports disclosed herein, when used with controllers for drone flight and virtual reality and augmented reality in particular, allow for mobility of the user while maintaining precise control of the point of reference (POR).

Referring now to FIG. 1, hand controller 100 is intended to be representative of controllers with one or more control members that are displaced by a user's hand to generate control inputs for moving a virtual or real target. The controller is comprised of a hand controller comprised of least one control member and a base, frame, brace or other type of platform (not shown) that provides a frame of reference and an object against which the control member is reacted to in order to measure displacement of the control member. This example of a controller is comprised of a first control member 102, a second control member 104, and a third control member 106. The first control member can, optionally, be configured or made to be removably attached to a base or other device using a connector. In this representative example, the bottom of the hand controller is plugged into a connector 108. The connector may include contacts 110 for making electrical connections to transmit signals and power to the hand controller. The connector is, in turn, connected with a post 112 that is pivotally supported by a gimbal or similar mechanism that allows rotational or angular displacement of the post around two and, optionally, three axes mutually orthogonal axes with common origin at the pivot point. A button, detent or other retention mechanism, represented by button 114 that operates a latch for engaging the base of the hand controller, can be used to hold and then release the hand controller from the connection. This particular example is intended to connect to a post of a gimbal for allowing user displacement of the first control member.

Figure 2A:
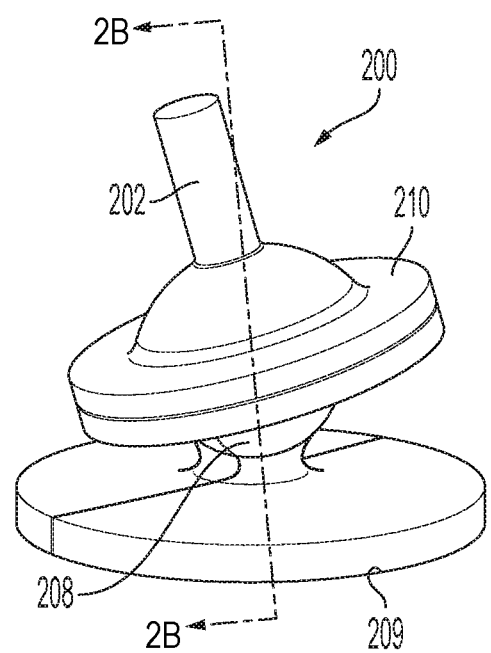
FIG. 2A illustrates schematically a gimbal support for a control member that is displaceable in at least two degrees of freedom.
Figure 2B:
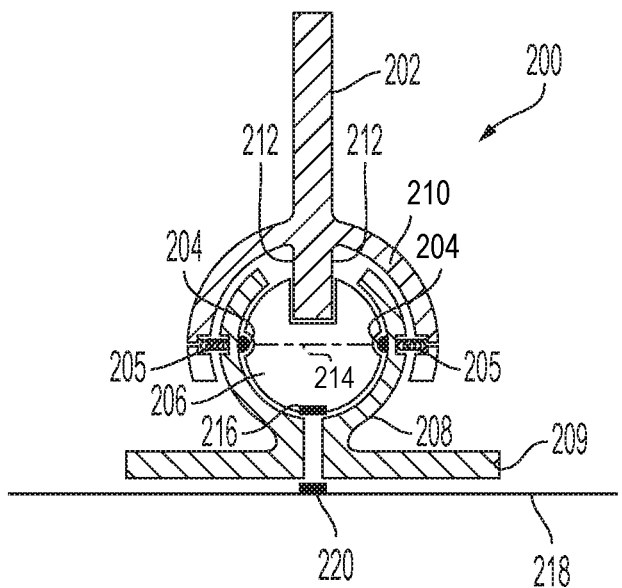
FIG. 2B is cross-section of the FIG. 2A taking along section lines 2B-2B.
Figure 3A:
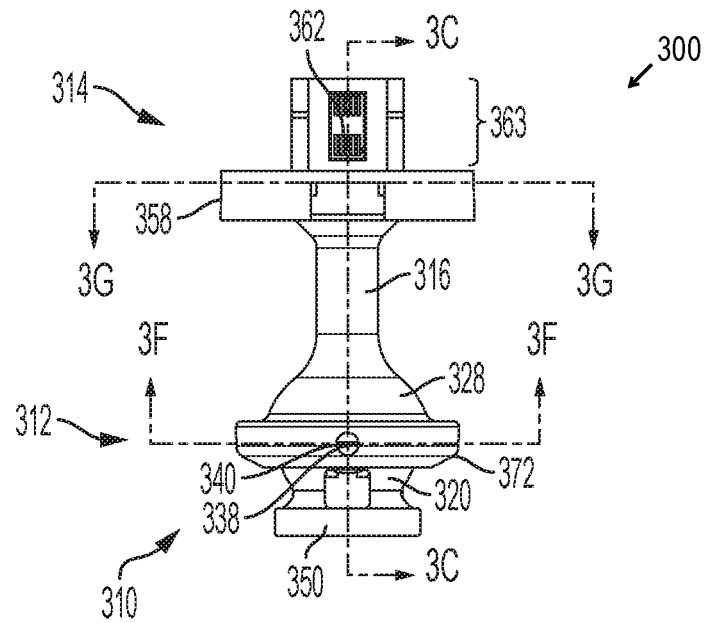
FIG. 3A is a front view of another embodiment of a gimbal support.
Figure 3B:
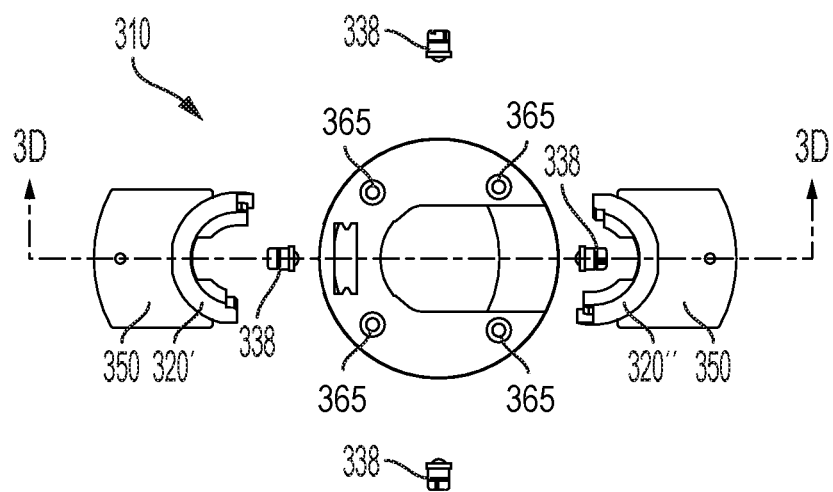
FIG. 3B is an exploded top view of the gimbal of FIG. 3A.
Figure 3C:
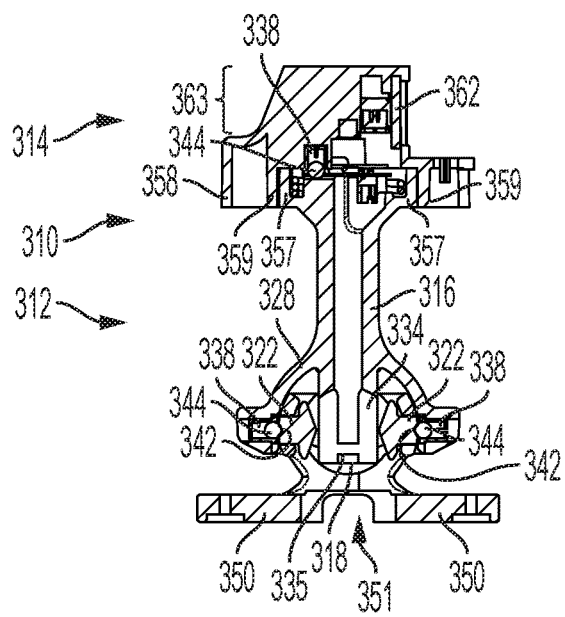
FIG. 3C is a cross-section of FIG. 3A, taken along section lines 3C-3C.
Figure 3D:
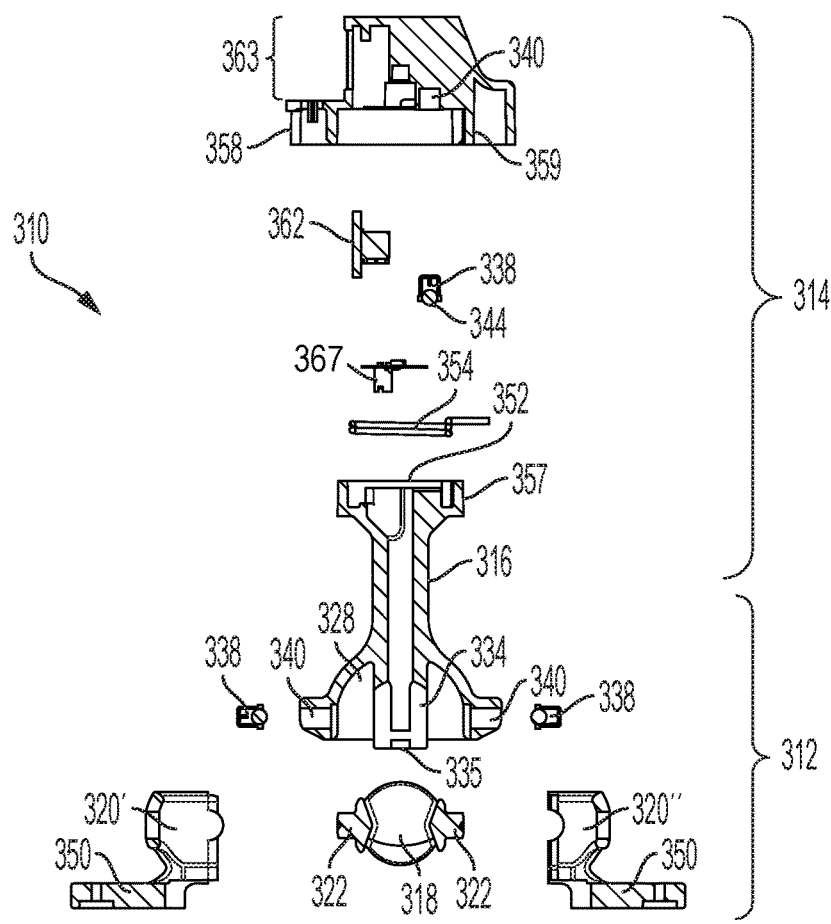
FIG. 3D is a cross section of the exploded view of FIG. 3B, taken along section line 3D-3D.
Figure 3E:
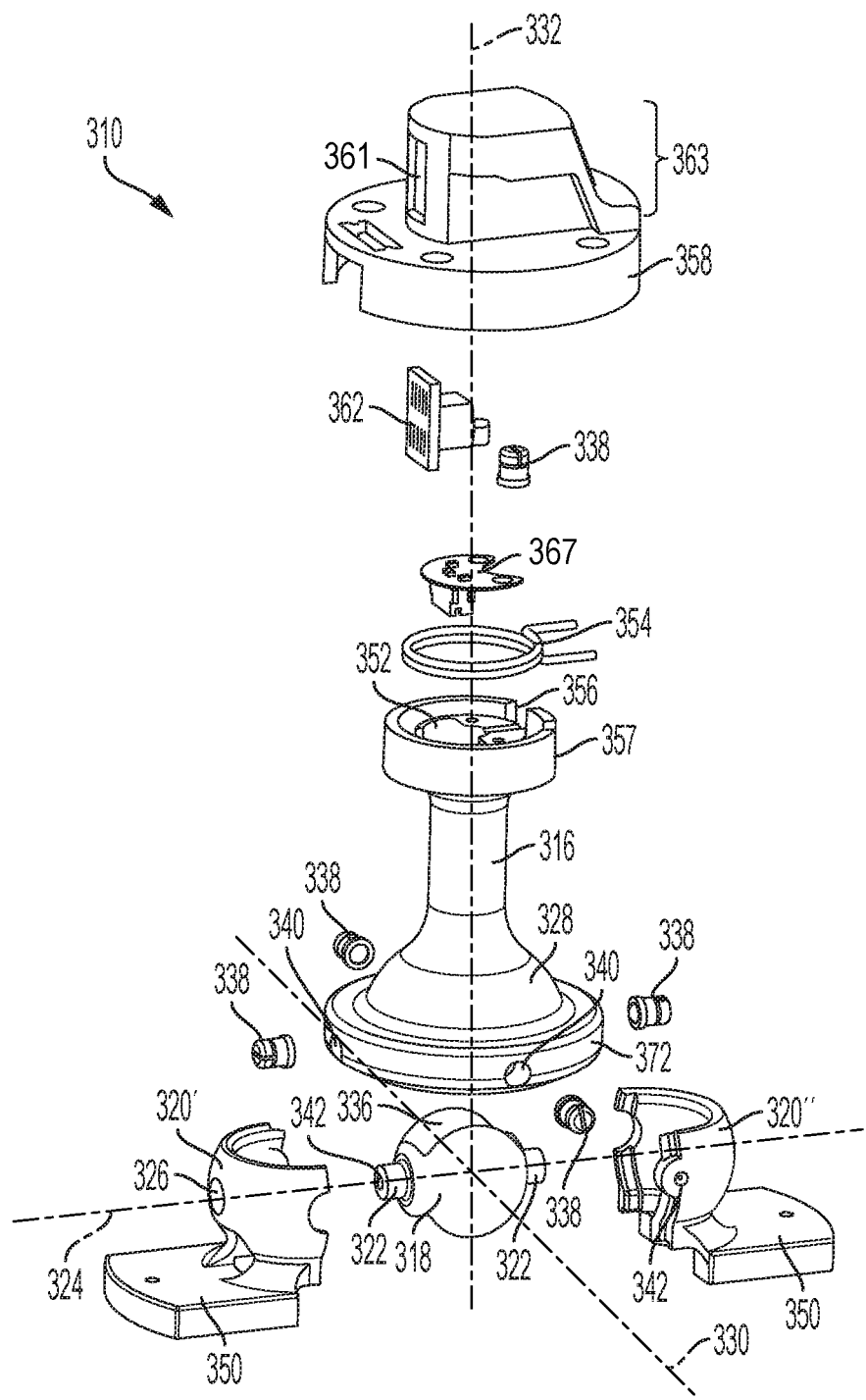
FIG. 3E is a exploded perspective view of the gimbal support of FIG. 3A.
Figure 3F:
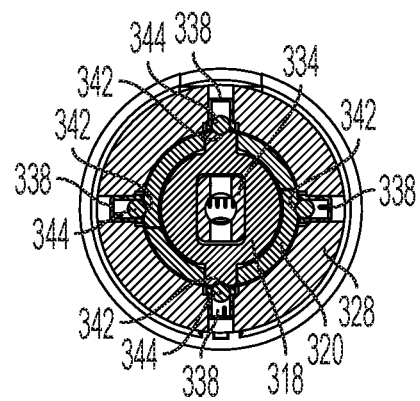
FIG. 3F is a cross section of FIG. 3A, taken along section line 3F-3F.
Figure 3G:
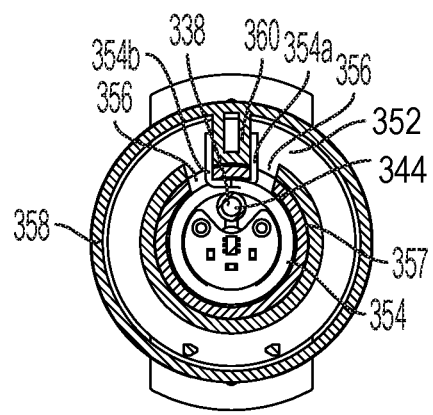
FIG. 3G is a cross section of FIG. 3A taken along section line 3G-3G.
Figure 3H:
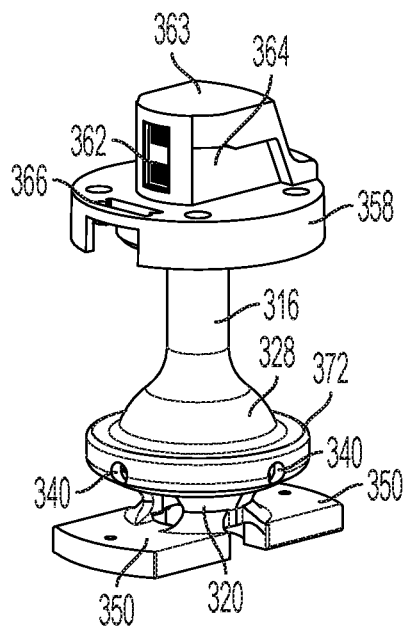
FIG. 3H is a front, side perspective view of the gimbal support of FIG. 3A.
Figure 3I:
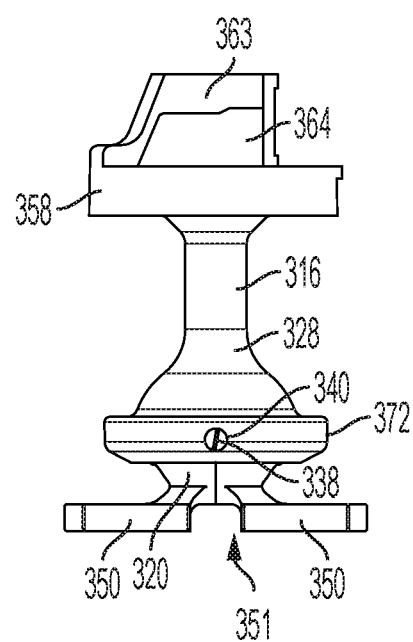
FIG. 3I is a side view of the gimbal support of FIG. 3A.
Figure 3J:
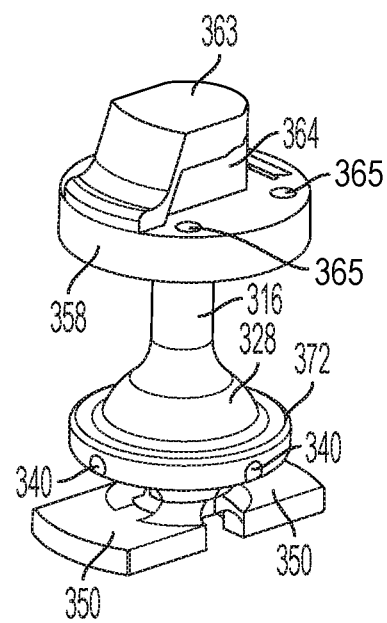
FIG. 3J is a rear, side perspective of the gimbal of FIG. 3A.
Figure 3K:
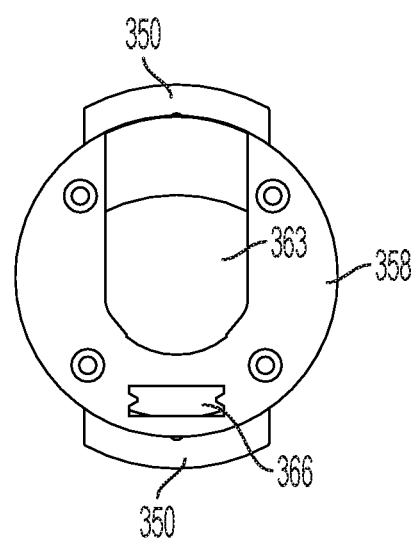
FIG. 3K is a top view of the gimbal support of FIG. 3A.

FIGS. 2 and 3 illustrate schematically an example of a gimbal 200 that can be used to support simultaneous angular displacement and measurement of the angular displacement in two degrees of freedom of a control member, such as the first control member. If only a single degree of freedom is desired, rotation of the gimbal about one of the two axes can be selectively locked, either temporarily or permanently (meaning not intended to be unlocked without removing, replacing, damaging or altering the structural members of the lock.) The lock can be implemented at the time of assembly (the original assembly or during repair or modification). Locking can be done physically by incorporating a structural feature that interferes with pivoting about one axis of rotation. Examples of such a lock include a pin that can be placed or selectively slid into and out of an interfering position or a latch that can be pivoted into and out of an interfering position, either selectively or permanently. Alternatively, at the time of making the gimbal, a component that allows for movement in one of the degrees of freedom can be substituted with one that does not allow for movement in that degree of freedom. In other embodiments the lock can be implemented with a magnet or electromagnet that provides sufficient resistance.

The gimbal can be mounted in a base, with a post 202 for coupling the gimbal to a hand controller, or in a hand-held controller with the post connected to a base. The gimbal 200 may also be adapted for mounting within a first control member to support and measure angular displacement of a second control member about one or more axes of rotation.

In this particular example of an embodiment, the gimbal 200 comprises at least two detents 204 in the form of balls that are biased by springs 205. Note that only one pair of detents are shown. The pair of detents that can be seen are for generating a mechanical force feedback when entering or leaving a null position for one axis of rotation. The other pair would be oriented orthogonally to the pair that can be seen and are for generating mechanical force feedback for rotation about a second axis of rotation. Note that a single detent could be used for each direction of rotation, but a pair provides balance. Furthermore, in an alternate embodiment in which the gimbal can be locked or blocked from rotation about one axis to allow only for rotation about one axis, the detents for generating force feedback for rotation about the locked or blocked axis could be omitted. Ball 206 is mounted within a socket 208 so that it can freely rotate within the socket in two degrees of freedom. However, a tongue and groove arrangement or similar feature could be used to lock the ball and socket to one degree of freedom of rotation. A base 209 is representative of a structure for mounting the gimbal, against which the hand controller may react. A cap 210 extends over the spherically-shaped outer surface of the socket so that the post can pivot the cap. An extension or key 212 fits within a complementary opening formed in the ball 206 so that angular displacement of the post 202 also rotates the ball. All detents engage the groove 214 when the ball is rotated to the null position in both directions of rotation. The two pairs of detents engaging and disengaging provide mechanical tactile feedback to a user at null positions in two axes of rotation (pitch and roll, for example). To detect sensor rotation, one or more magnets 216 are placed at the bottom of ball 206 (when in the null position.) This allows a printed circuit board (PCB) 218 with at least one Hall effect sensor 220 to be positioned closely to detect and measure angular displacement of the ball in up to two rotational degrees of freedom and thereby generate signals representative of the displacement. The Hall effect sensor is preferably a three-dimensional Hall effect sensor, in which case one is sufficient. One advantage to this arrangement is that the springs and the joystick are positioned higher up, keeping the bottom of the gimbal available for placement of a Hall effect sensor. Other types of sensors could be, in other embodiments, substituted for the Hall effect sensor and magnet, including optical encoders, potentiometers, and other types of sensors or detectors for detecting rotation of the gimbal about each of the axes. This gimbal mount could be used in other control applications and not just the hand controllers described herein.

In the embodiments of a hand controller described above, when the hand controller is mounted to a base, the first control member is, for example, connected with a ball joint or gimbal for rotational displacement about up to three axes and thus with up to three degrees of freedom. The base in the illustrated embodiments may also include signal conditioner circuits, processes, memory (for storing data and program instructions) and a source of power, as well as interfaces, wired and/or wireless, for communicating control signals generated by the controller system.

FIGS. 3A-3K illustrate another representative example of a gimbal support for a control member of a controller that can be adapted to sense angular displacement of the control member in one, two or, if desired, three degrees of freedom. The gimbal support 310 couples the control member and a platform, such as a base that will be held by one of the user's hands or something that is worn by the user, against which the control member is reacted to generate control inputs. The lower gimbal section 312 functions to constrain movement of a post 316 to which a control member (not shown) is attached so that the control member and post are free to pivot around each of two axes of rotation 324 and 330 that are orthogonal to each other. The lower gimbal section 312 is comprised of, in effect, of two gimbals arranged to support pivoting the control member about each of the axes of rotation 324 and 330, which are orthogonal to each other.

The gimbal support 310 further includes an optional rotational support and sensor portion 314 mounted on post 316 that allows rotation of a control member in a third degree of freedom around a z-axis that can be measured. The post 316 has a central axis 332 that intersects with axes of rotation 324 and 330 at the center of the lower gimbal section. All three axes are mutually orthogonal to each other. The angular displacement of the post 316 (or its central axis 332) from a null or center position around each of the axes of rotation 324 and 330 is sensed and a measurement of the angular deflection or displacement is determined.

In this representative example, the lower gimbal section 312 includes a first member 320 that remains fixed and second member 318 that will rotate inside of it along at least one axis. The first member 318 has a spherical or spheroidal ball-like shape and the second member forms an cavity with inner surface that is shaped to accommodate the first member. The first member 320 will be referred to as the "socket" or "first member" in the following description, and the second member 312 will be referred to the "ball" or "second member." The ball 318 is constrained so that it rotates around one axis, but in alternative embodiments could be permitted to rotate in around additional axes. Although the inner surface of the first member 320 could be formed to support the ball for rotation within the socket, the ball 320 is, in this example, supported for rotation by, and its movement is also limited by, co-axial projections 322 that are journaled within openings 326 in the sides of socket 320. The socket 320 is formed from two socket halves, 320' and 320," to make it easier to manufacture and assemble but it can be constructed in other ways. The ball 318 is restricted to rotate only about axis 324. It is, in effect, supported for rotation about axis 324 by an axle comprised of co-axial projections 322 that extend from the ball into openings 326 that are formed in the socket 320. The axis of the co-axial projections 322 align with the axis of rotation 324 and is coincident with the center of ball 318. The socket therefore does not support rotation of the ball as would a conventional ball and socket. Other means for mounting the ball 318 to rotate around axis 324 could be employed. For example, in an alternative arrangement, at least one of the shafts and openings can be reversed, with the shaft formed on the socket and the opening formed in the ball. Alternatively, a separate shaft could cooperate with two openings, one in the socket and one in the ball. In other arrangements, a cooperating pin and circumferential groove could be formed on the socket and ball, the pin following the groove to allow rotation about at least one axis but not another axis. In this alternative embodiment, the socket would support the ball in the manner of a conventional ball and socket.

A lower portion 334 of post 316 cooperates with and is received into a slot 336 formed in ball 318. The lower portion 334 of the post is shaped so that the walls of the slot prevent it from rotating within the slot about its central axis 332. Furthermore, the slot and post are configured to support the post in the slot so that it can pivot about axis of rotation 330 within the slot, at the pivot point at the intersection of axes of rotation 324 and 330, without rotating the ball 318. The ball 318 functions as two gimbals and need not be, at least in this particular example, a complete ball or even spherically shaped.

The socket 320 has a spherical outer surface that complements a spherical inner surface of a cap 328 supports movement of the cap 328 like a ball and socket joint, with the outer surface of socket 320 acting like a ball and the inner surface of cap 328 forming a cup-like depression that acts a socket, with the origin or center of the spherical surfaces located at the intersection of mutually orthogonally axes of rotation 324 and 330. The cap 328 depends from post 316 and extends around the outside of socket 320. The cap 328 is used to create haptic feedback when the post 316 pivots into or away from the null or zero command input position for each of the two degrees of freedom. The cap and socket 320 interact to establish or define a null position for the post about each of the axes of rotation 324 and 330 (or in each degree of freedom) and to generate a haptic feedback when the post is moved from the null position in each of the degrees of freedom. A means for generating haptic feedback in this embodiment is mechanical and comprises at least one detent for each degree of freedom. In this example, each of the detents has a rounded or spherical engaging surface that is biased outwardly but displaceable inwardly once the biasing force is overcome. Each of the detents in the illustrated example is comprised of ball 344 and one or more biasing springs mounted in a sleeve with a lip that retains the ball but allows it to extend. The cap 328 positions the detents 338 in the correct position. Each of four detents 338 are received into or mounted in recesses 340 formed in a circular, belt-like part of the cap 372. The detents are thus all located in the same plane, which is normal to the central axis 332, and are equally spaced at 90-degree intervals around the intersection of the central axis and the plane. When the post 316 is in a null position, one opposing pairs of detents 338 is positioned so that the detents in that pair are colinear along a line that is parallel to axis of rotation 324, and the other opposing pair of detents 338 are colinear along a line that is parallel to axis of rotation 330.

While gimble 312 is in the null position, each detent 338 is aligned with a corresponding dimple 342 or other type of recess, indentation, depression, groove, or surface feature formed on the outer surface of the socket 320, which remains stationary with respect to the cap. The surface feature is shaped to allow the detent to extend under its biasing force and thus interfere with the relative movement of the cap and socket. When a sufficient torque is applied by the post 316 to overcome the force created by the interference of the detent and the dimple, the biasing force is overcome, and the detent is pushed inward to allow the relative movement. The detent remains pushed in or retracted until it aligns with a recess or depression in the surface that allows it to extend. A deflection of the post 316 around each one of the axes of rotation will thus be met with at least some resistance, and the resistance will be felt as a haptic feedback to a user moving the post by moving a control member. Similarly, when the post 316 pivots back to a null position about either or both of the axes of rotation 324 and 330, the detents will extend into the dimples. A user will feel the actuation force to relax subtly as the detent passes by one side of the wall of the recess that forms the dimple and extends into the dimple. The user may also feel the detent hitting the wall of the dimple on the other side of the dimple, reinforcing the user's sense that they're back at zero. A drop off in resistance that is followed by a ramp up of resistance is the haptic cue that communicates to the user that a null position about either of the axes of rotation has been reached without having to look or to find the null position, such as by releasing the control member and allowing it to return under a spring force to the null position. This can be of advantage in many applications, particularly those in which the user is mobile.

In this example, one set of opposing dimples 342 are formed on the exterior of socket 320. The other set are formed on the ends of co-axial projections 322 because they extend through and are journaled by an opening formed in the socket where the dimples would otherwise be formed. However, in alternative embodiments, the interface of the socket 320 and ball 318 could be made differently, allowing the dimples or other surface features that interfere with the detents to be formed on the socket. Furthermore, the location of each detent and dimple (or other interfering surface feature) could be reversed. However, locating the detent mechanism in the cap can have several advantages, including allowing the socket and ball to be made smaller and more compact and making assembly easier. Although semispherical in this embodiment, the geometry does not require the cap to have the form of a half sphere to hold and position the detents. Furthermore, the outside of the socket 320 does not support the cap, though it can constrain movement of the cap. The inside surfaces of the cap do not need to be continuous or even spherical as long as they do not do not interfere with desired movement of the cap. The outer surface of the socket should, however, remain spherical within the range of movement of the detents so that the detents do not extend to interfere with movement of the cap (and post) and create unwarranted forces.

The socket 320 in the lower gimbal portion 312 is mounted on a base frame 350, which will be connected with a base or platform, against which the control member will be reacted.

Detection of rotation of the gimble portion 312 about axis of rotation 324 or axis of rotation 330 may be accomplished by known methods. One example is by use of a Hall effect sensor. A magnet (not shown) is affixed to the end 335 of the lower portion 334 of the post 316, below the intersection of the axes of rotation 324 and 330, which define the pivot point for the post 316 and control member. The angular deflection of the end 335 will be the same as the angular deflection of a control member in the form of a joystick (such as control member 368 of FIGS. 4A and 4B) that is attached to it, and the distance of travel of the magnet will be proportional to it. The change in magnetic field as it moves from a point directly beneath the end of the post when the post is in a null position in both degrees of freedom can be detected by a 2 or 3-dimensional Hall effect sensor (not shown) that is mounted in line with the central axis 332 under the ball 318, in the area indicated within frame 350 by the end of arrow 351. The Hall effect sensor will detect movement of the magnet and generate signals indicative of the movement of the magnet, which can be used to determine the direction and amount of movement of the magnet.

To sense rotation of a control member (not shown) about central axis 332, the control member is coupled to a cap 358 of the rotation sensor 314 on the upper end of post 316. The cap rotates relative to the post 316, about central axis 332, and thus is used to measure a third degree of rotational freedom in which a control member (for example, control member 368 in FIG. 4) is capable of moving. The cap 358 is capable of rotating relative to the post 316, which remains stationary. A recess 352 between the upper end of post 316 and the cap 358 houses a centering spring 354 that biases the cap 358 towards a null position and applies a re-centering force to the cap when it is rotated in either direction about the central axis 332. The spring has two legs 354a and 354b that each extend through a separate one of the openings 356 in a circular wall 357 on top of the post 316. A circular wall 359 extends down from the bottom of the cap 358 and cooperates with the circular wall 357 on the post to center the cap on the post 316 as it is rotated. The wall 359 also has openings that match openings 356. A tab 360 extends down from the inside of cap 358, between the two legs 354a and 354b of the spring 354. When the cap is rotated in either direction, the tab 360 shifts and pushes against one of the two legs while the other leg is constrained by the inside edge of the opening 356 through which it extends, thereby creating a force that is applied through the tab and cap 358 to a coupled control member (such as control member 368 of FIG. 4). This is but one example of a structure for generating a re-centering force that can be sensed by a user as the user twists the control member. Other structures are possible.

The rotational support portion 314, which acts as rotational support and sensor, also includes, in this embodiment, a detent 338 that assists with holding the rotational support at the null position and provides haptic feedback to the user when rotation support portion 314 enters and leaves the null position. A recess 340 in the mounting of the rotational cap 358 holds the detent 338 in a vertical orientation. In the null position the detent 338 engages a dimple or other recess or interfering surface feature (not visible in figures) formed in the top of the post. Application of rotational forces to mounting cap 358 force detent 338 to retract to allow rotation, creating a haptic event that can be felt by the user. Another haptic feedback event occurs upon return to the null position. In this example, a user will feel drop in resistance entering the null position, as the detent extends, and then will feel an increase in resistance as the detent begins to engage the opposite side of the dimple or recess, thus confirming to the user that rotation is at the zero or null position without ever having to look at his or her hand or question whether the command input is at zero.

Mounting cap 358 includes a knob 363 or extension that acts as one part of a mechanical coupling member when joined with a complementary part on the bottom of a control member. It includes a narrow middle portion or neck 364, onto which a mating bottom or base of a control member (not shown) can be slid and retained once latched. The latch is not shown, but it would extend through opening 366. It may be designed with a button or other member (not shown) to allow it to be released by a user. Connecting the control member using a quick release (manually operable by a person or a simple tool) allows the control member to be removed for storage or to be replaced with a control member that is made for a different sized hand. Additionally, the knob 363 includes an electrical connector 362 in opening 361 that enables a circuit to be formed to communicate signals between the controller and base. It also may transmit power for the electronics in the control member. Holes 365 may be used to connect a skirt or boot between the top of the post and a base or enclosure in which it is mounted or to a plate that is mounted to the base.

Rotation of rotational support portion 314 can be detected and converted into a useable signal by any number of known methods, an example of which would be the use of a magnet and a Hall Effect sensor. Other examples include optical encoders, potentiometers and similar rotational sensors. In this example, the Hall effect sensor and supporting circuit board 367 is placed within recess 352. The Hall effect sensor detects changes in a magnetic field generated by a magnet (not shown) placed within cap 358 as the cap is rotated relative to the post.

Figure 4A:
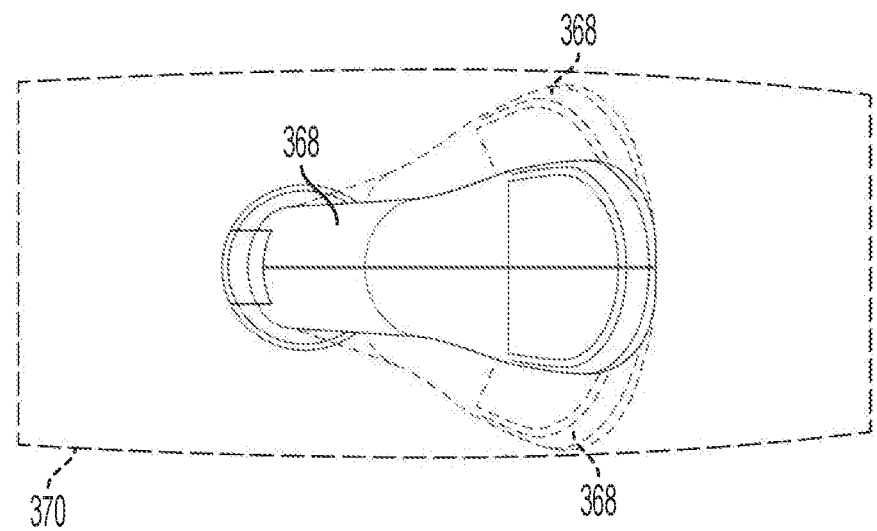
FIG. 4A is top view of a schematic illustration of a controller with a control member mounted to the gimbal support of FIG. 3A-3K.
Figure 4B:
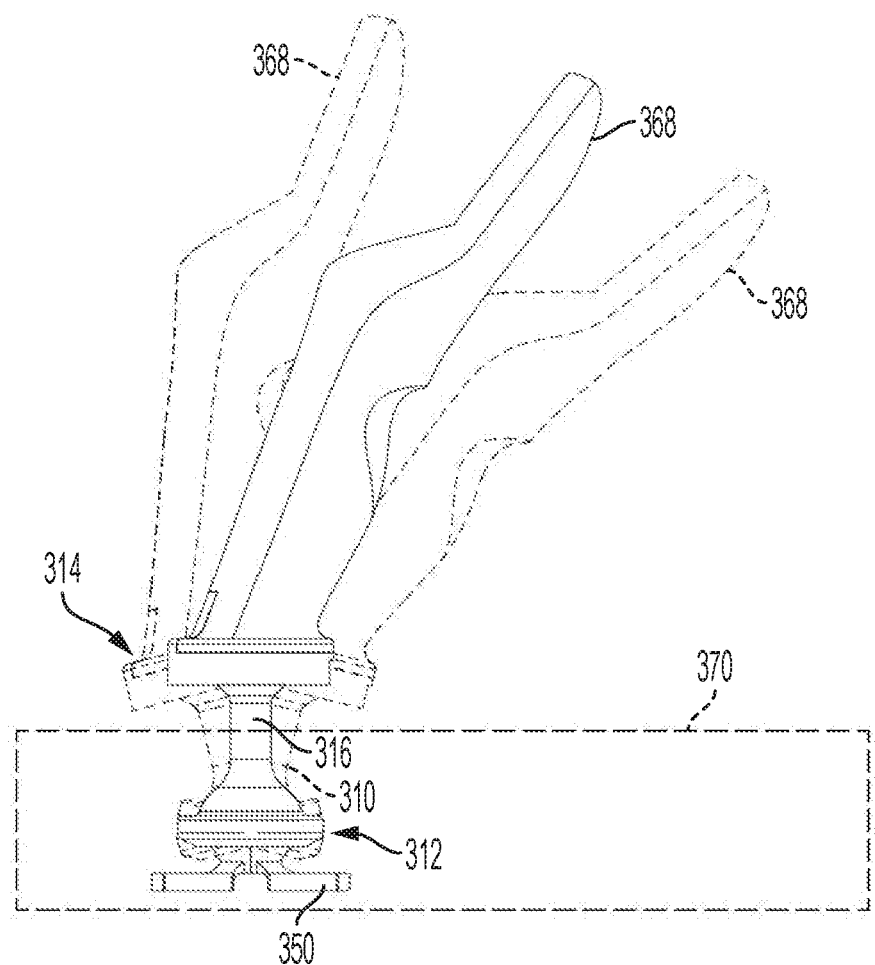
FIG. 4B is a side view of the controller of FIG. 4A.

Referring now only to FIGS. 4A and 4B, the sensor 310 is shown mounted to a base 370, with a control member 368 mounted to the rotational support portion 314 and the lower gimbal portion 312 is coupled with the base 370. FIG. 4A illustrates the control member being twisted left and right (indicated in broken lines) from a null position (indicated in solid lines) FIG. 4B illustrates the control member being pivoted fore and aft from the null position (indicated using solid lines). The sensor 310 could be inverted, so that it is mounted within the control member and the rotation sensor portion 314 is coupled with a base or other platform.

Figure 5A:
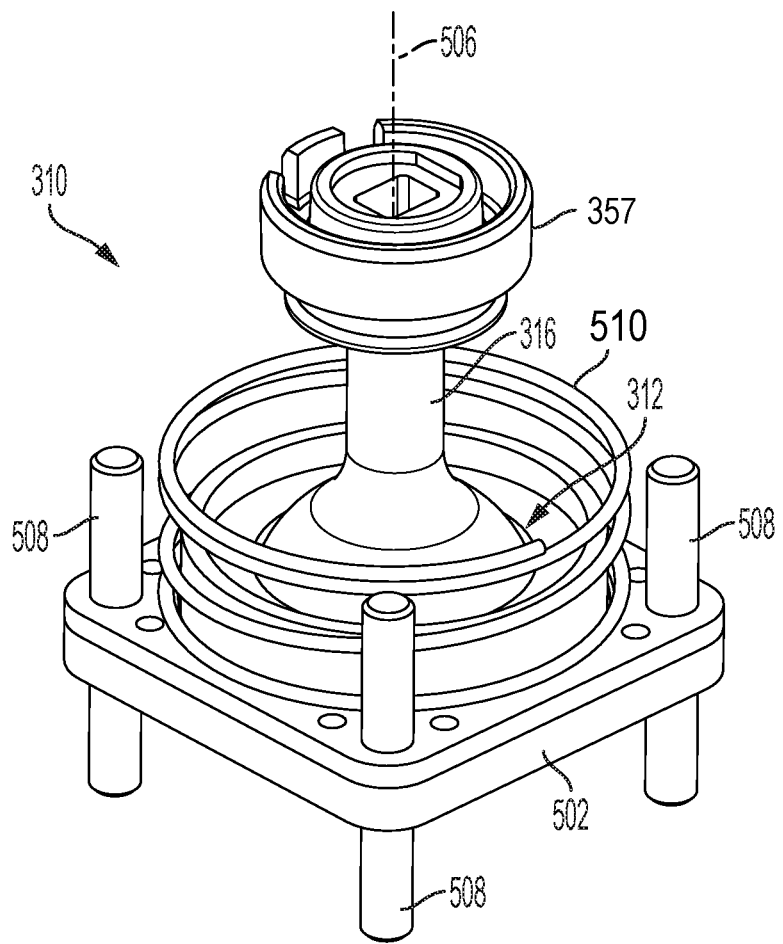
FIG. 5A is a perspective view of the lower gimbal support shown in FIGS. 3A-3K with re-centering or force-feedback mechanism.
Figure 5B:
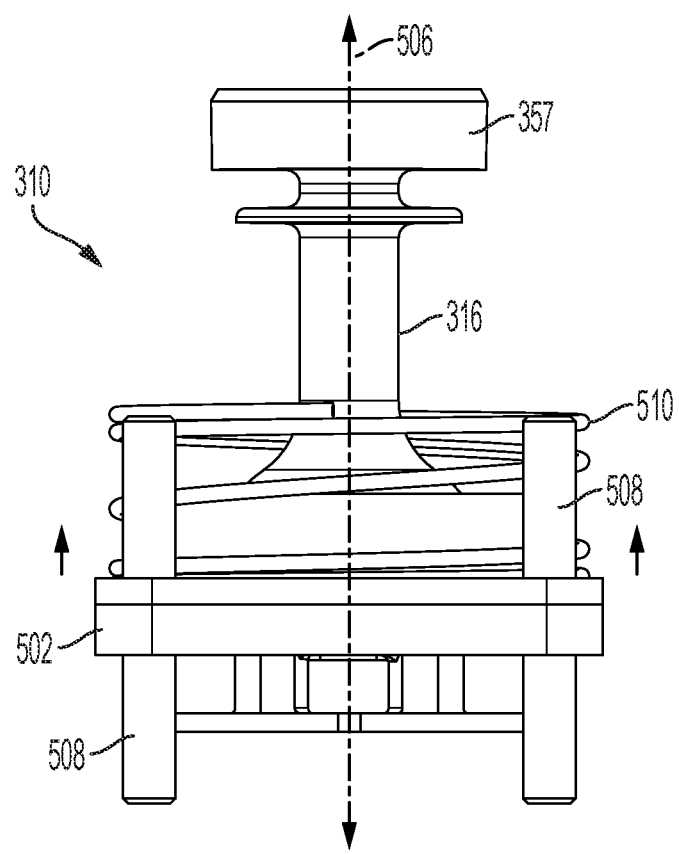
FIG. 5B is a side view of the gimbal support of FIG. 5A.
Figure 5C:
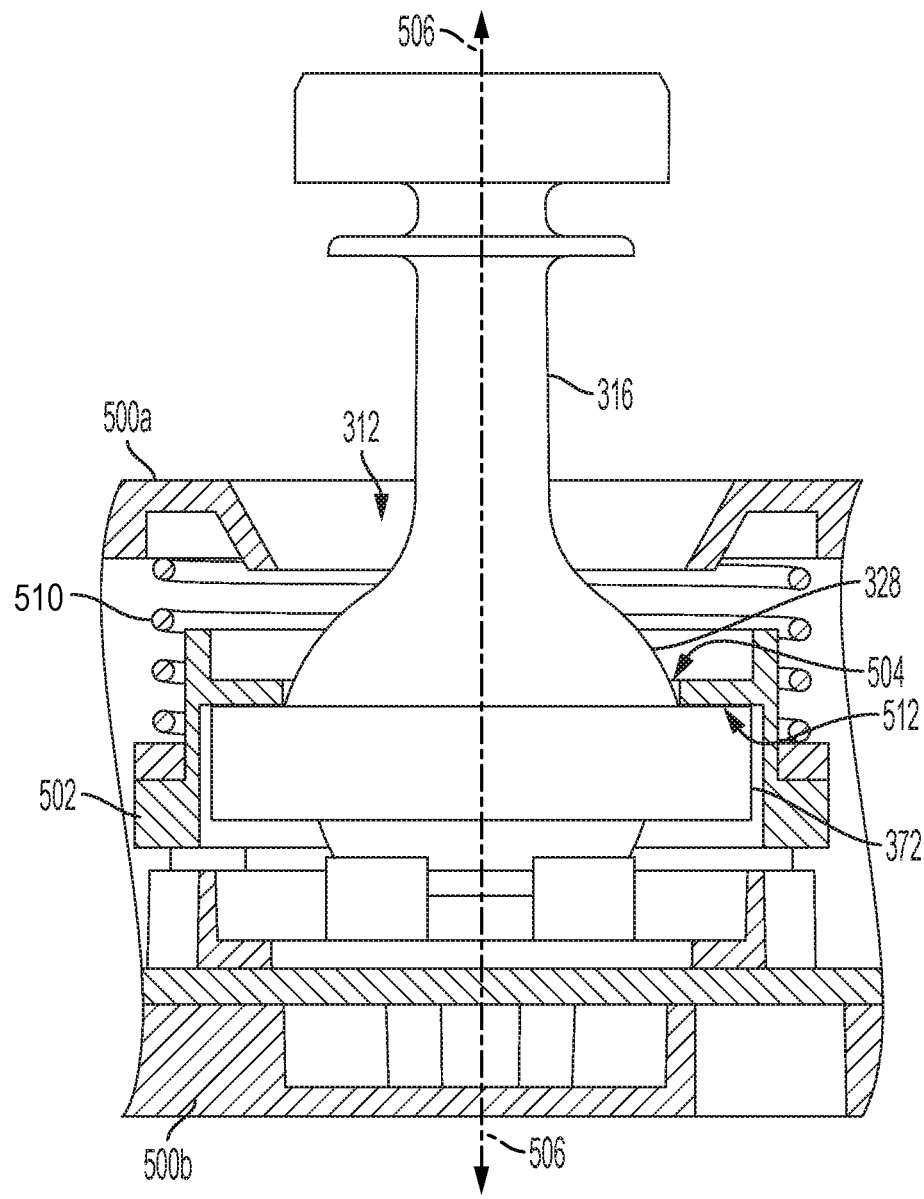
FIG. 5C is a simplified, partial cross-section through of the lower gimbal support shown in FIGS. 5A and 5B mounted within an enclosure or base. The lower gimbal portion not sectioned and certain structural features are simplified or omitted for clarity.
Figure 5D:
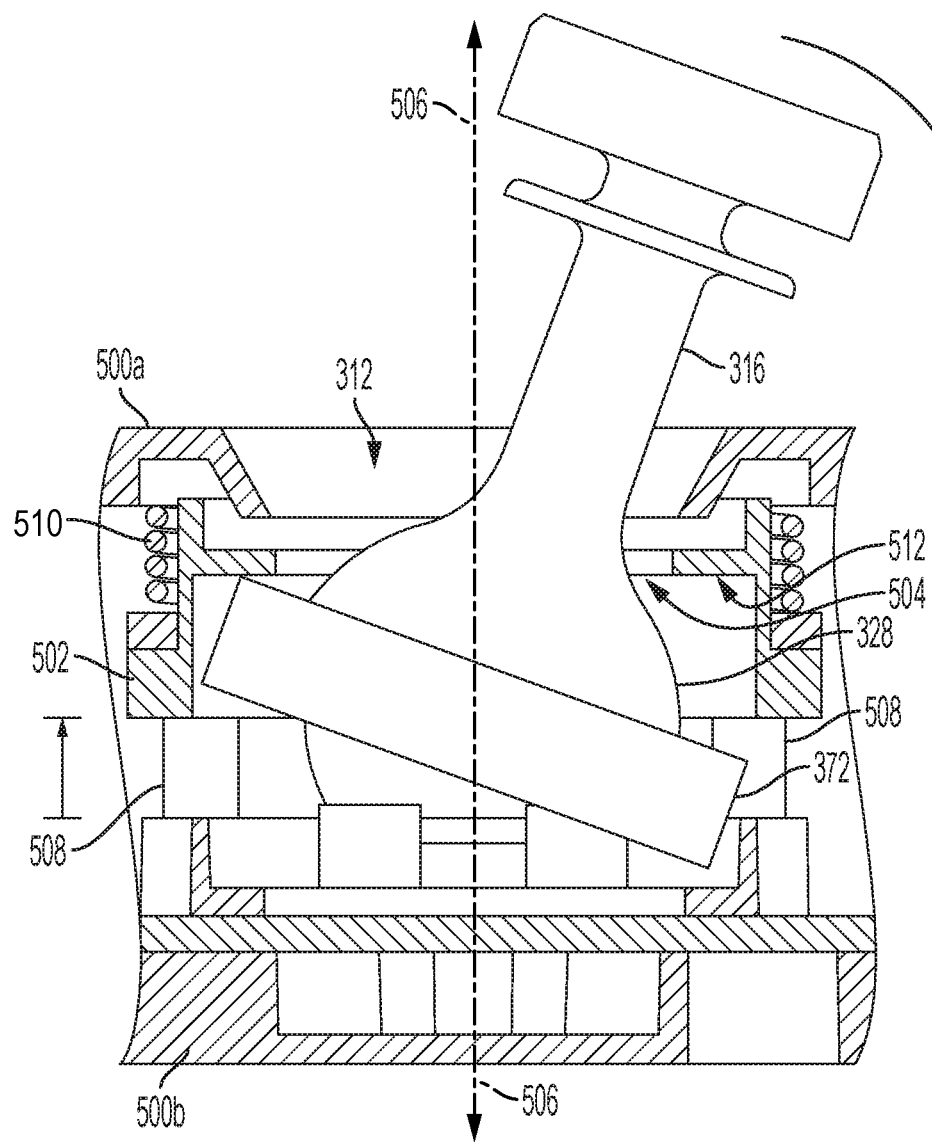
FIG. 5D is the partial cross-section of FIG. 5C with the lower gimbal portion in a second position.

Referring now only to FIGS. 5A-5D, only the lower gimbal portion 312, post 316, and the circular wall 357 of the upper portion 314 are shown for purposes of illustrating an embodiment that is an example of re-centering mechanism that provides a force feedback to the user during excursions from the null positions for the lower gimbal. FIGS. 5A and 5B are side and perspective views. FIG. 5C is a simplified, partial cross-section through of the gimbal support shown in FIGS. 5A and 5B mounted within an enclosure or base (not shown in FIGS. 5A and 5B) comprised of an upper wall 500a and bottom wall 500b. The lower gimbal portion 312, post 316 and circular wall portion 357 of upper, rotationally support portion are not cross-sectioned. Furthermore, certain structural features are simplified or omitted for clarity.

The re-centering mechanism is comprised of a yoke 502 that surrounds the post 316 with an opening 504 large enough to allow the post to pivot freely in two degrees of freedom. The yoke is restrained to allow movement only along an axis 506 that is orthogonal to the axes of rotation of the lower gimbal portion 312. The yoke is biased to its lowest point excursion by a spring 510 (a compressed coil spring in this example) when the lower gimbal is in a null position for both axes of rotation, which is shown in FIGS. 5A and 5B. In this "null" position, a bottom surface of the yoke is adjacent (and may rest or against) a top surface of a horizontally extending structural feature of the lower gimbal portion 312 that pivots with the post 316. In this example the disk-shaped housing 372 that supports the detents 338 and is part of the post 316 pushes against the yoke when the post 316 (and lower gimbal portion) pivots, causing the yoke to be displaced upward against the downward biasing force of the spring 510. Housing 372 has a circular outer circumference that contacts a planar bottom surface 512 of the yoke at a single point as the gimbal is pivoted.

Spring is 510 trapped at one end by a structural feature of the enclosure in which the gimbal is mounted at the other end by the yoke. The spring is therefore compressed when the yoke is displaced upwardly. The spring force is directly related to the displacement of the yoke, with greater force being generated with greater displacement. The greater the deflection or angle of rotation of the post 316 about either of the two axes of rotation, the greater the displacement of the yoke and thus the greater the force sensed or felt by a user gripping or pushing against a controller connected with the post. The force feedback also biases the post to the null position and re-centers it when, for example, a user releases a control member (not shown) attached to the post.

In this example, the spring is trapped by the upper wall 500a. However, any other structural feature that remain in a fixed position relative to the frame of the gimbal support when the gimbal pivots could be used to compress the spring. Furthermore, if the position of the structural member is adjusted along axis 506, the amount of force can be adjusted by shifting the position of the structural member. Alternatively, the amount of force can be made adjustable by making adjustable the position of the lower end of the spring relative to the yoke, such as by adjusting the dimension of the yoke or position of a structural member on the yoke that shifts the position of the spring relative to the yoke.

In alternative embodiments, a collar or other disk-shaped structure with an outer, circular circumferences on the lower gimbal portion, such as collar that is attached to or formed with the post 316 or cap 328, could be used to force displacement of the yoke.

To constrain movement of the yoke to translation along axis 506, the yoke slides on posts 508. There are four posts in the example, but there could fewer or more posts. Although square in this example to accommodate the posts, the yoke could be made in other shapes. The posts can be also used to mount and position the gimbal support 310 within an enclosure or other platform against which it will be reacted. Alternative means for constraining movement of the yoke could also be used. For example, the yoke could have a cylindrical outer surface that slides within a sleeve-like or other structural feature formed within the closure that has a complementary, cylindrically shaped inner surface.

One advantage to this particular embodiment is that by constraining movement of the yoke to translation along one axis and ensuring that the spring is compressed only along its axis, a consistent and predictable force that is relatively linear (though not necessarily linear on a first order) and relatively proportional to the displacement of the yoke can be generated for application to the lower gimbal. Furthermore, the entire force is applied evenly around the yoke so that the force that is applied will not vary where the collar or other horizontally extending feature of the lower gimbal contacts the yoke.

Many other types of controllers and control members capable of being displaced by a finger or a hand of a user pivoting it about at least one, at least two, or three axes could be used with a gimbal support 200 (FIGS. 2 and 3) or gimbal support 310 (FIG. 4). A joystick is a non-limiting, representative example of a grippable form factor for a control member that can be used with either gimbal support, as well as other variations. However, control members with other forms can be used to deflect a gimbal sensor like gimbal supports or sensors shown in FIGS. 2A-2B, 3A-3K, and 5A-5C. It could also be used to sense displacement of a control member mounted on another control member or on a base, which is manipulated by a finger or thumb to cause angular deflection of the gimbal or a translation of a one or two-axis gantry that is coupled with the gimbal to cause its angular deflection. Furthermore, a control member, in addition to moving in two degrees of freedom to angularly deflect the gimbal, could also be translated in a third degree of freedom, either along one of the two axes of the gimbal or along the third axis to provide a third degree of freedom. For example, a two-dimensional gimbal sensor—for example, gimbal sensor 200 or gimbal sensor 310 with or without the rotational support portion 314—could be mounted so that it is translated up and down along a third axis that is orthogonal to two axes of rotation of the gimbal, with the translational movement of the gimbal being detected and measured in addition to its rotation.

In one exemplary application, the signals from one or more detectors or sensors associated with the gimbal that detect and measure angular deflection of the gimbal are mapped by the controller to generate a forward/back or a pitch control input for a target and a left/right or roll control input for a target. However, in other applications, the deflections can be mapped to different control inputs if desired. One example of an implementation of the mapping is a programmed microcontroller or microprocessor that allows mapping of any of one the signals generated by the displacement of the control member for each of its degrees to any one of a set of control inputs for the target, depending on the application. The programming could be done when making the controller, but it could also allow for a user to change the mapping in a setup or dynamically.

Furthermore, a controller may have additional control members that can be displaced to generate additional control signals. For example, in one embodiment of such a controller a second control member is mounted on the first control member to generate one or more additional control inputs for controlling additional degrees for freedom of movement of the target. The second control member is, in one embodiment, mounted in a position that allows it to be displaced by one or more digits on the hand of the user that is displacing the first control member in one to three degrees of freedom. Such a unified, single-handed controller can be repositioned by a user using a single hand, thus enabling singled handed control of a target in four to six degrees of freedom. The control inputs of the second set are independent of the control inputs of the first set. In one embodiment, the second control member is movable with at least one degree of freedom and in other embodiments two or three degrees of freedom may be moved independently of the first control member. In response to its independent movement, movement of the second control member results in a second set of control inputs, one for each degree of freedom in which it can be displaced.

Figure 6A:
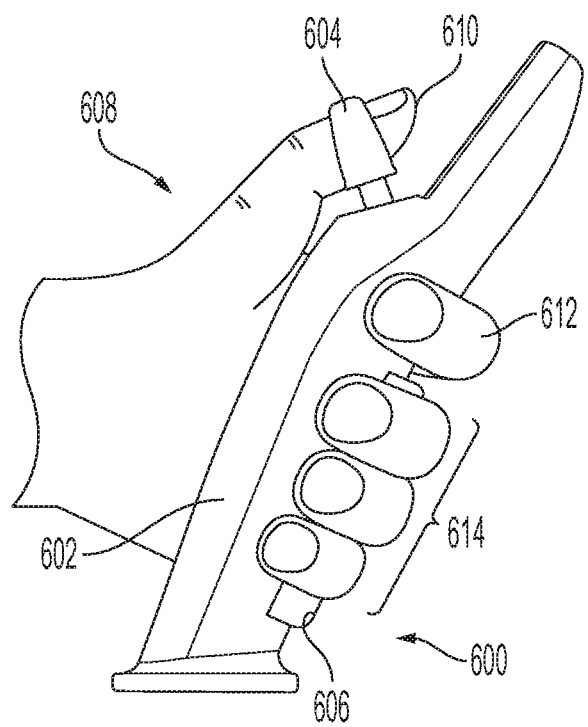
FIG. 6A is a side view of another embodiment of a hand controller without its base, the hand controller having first, second and third control members with the second and third control members at one end of their range of displacement or excursion.
Figure 6B:
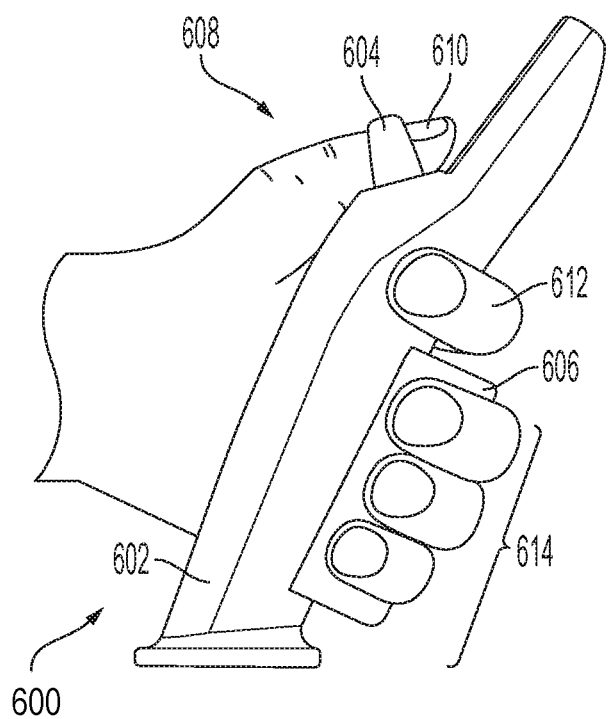
FIG. 6B is the same view as FIG. 6a, but with the second control member at the other end of its range of displacement.

FIGS. 6A and 6B illustrate an example of a single hand controller with a second control member mounted on a first control member, which is also dynamically balanced. Controller 600 uses two control members with four degrees of freedom for generating control inputs suitable for flying, for example, drone aircraft. The controller includes three control members: first control member 602, second control member 604, and a third control member 606. The third control member is coupled to the second control member by a linkage for enabling a user to dynamically balance the second and third control members. Applying force to one of the control members applies a force to the other control member. A sensor is used to sense the direction of displacement of the second control member or the linkage between the second and third control members. A base is not shown, but the first control member would be coupled to a gimbal-type mounting like the ones described above, to measure angular displacement to generate signals that a controller will use to generate control inputs.

Extended operation of a controller with a second member with a digit for independent control inputs, particularly when the second member is pulled up or pushed down by the thumb, might lead to fatigue. In another representative embodiment, a third control member is positioned on a first member and is capable of being displaced by one or more digits of the user's single hand. It is coupled with the second member to move in opposition to movement of the second control member in one of the degrees of freedom of movement of the second control member, for example in the one in which a user's thumb pulls up to displace the second control member. The third control member is, for example, mounted on the first member in a position for enabling one or more digits on a user's hand that are not being used to displace the second control member to squeeze the third member and cause its displacement. The third member thus displaces the second member when the third member is displaced inwardly by the user squeezing or pulling the third member with one or more fingers. Pushing down the second control member also pushes outwardly from the controller the third control member, allowing the user's thumb or index finger to be dynamically balanced by the user's other digits.

A user's hand 608 grips the first control member, in an area of the first member specially formed or adapted for gripping. The user's thumb 610 is being used to displace the second control member 604 along a Z axis (up/down). In this example, a thumb loop is used to allow the user's thumb to pull up on the second control member. However, the thumb loop does not have to be used. In other embodiments, the thumb loop can be replaced with another type of control member. The third control member is mounted lower on the grip portion and large enough for any one or more of the users third, fourth or fifth digits 614 to depress it inwardly, toward the first control member. The third control member could, alternatively, be mounted high enough to allow the user's index finger 612 to depress it.

In FIG. 6A, the second control member is extended upward, and the third control member is depressed. The user can cause this displacement by depressing the third control member, pulling up on the second control member, or a combination of both. In FIG. 6B, the second control member is pressed down, toward the first control member, causing the third control member to push outwardly from the first control member. The ability to push back on the third control member by squeezing with one or more fingers allows the displacement to be more easily controlled by the user than with the thumb alone.

In summary, the disclosure therefore contemplates use of the gimbal sensors like those described herein with single hand controllers having at least one control member that generates in response a first set of independent control inputs. Movement or displacement of the first member may be sensed, and a control input generated, for each degree of freedom using one or more sensors, each of which is capable of detecting and, if desired, measuring displacement in one or more of the degrees of freedom of displacement. In one embodiment, the first control member is in the form of a joystick (or joystick like device) and is configured to be gripped in a user's single hand by the user placing it in the palm of the hand and wrapping at least several of their fingers at least partially around the body of the first member to hold it.

A second control member can, optionally, be mounted on the first control member in a position to be manipulated by the user's thumb, index finger, or other digits. The second control member can be in the form of a loop, gantry, track ball, touch pad or other input device that can be translated, rotated, and/or pivoted in one to three degrees of freedom. It may, optionally, have its Z axis travel augmented by other third control member configured to be used by one or more fingers of the same hand that is gripping the first control member and that is moved in conjunction with, and in opposition to, the second control member.

Although it offers additional advantages when used with single handed controllers with two control members with a structure capable of controlling four, five or six degrees of freedom, the gimbal-type sensors described below can be used to detect and measure angular displacement and provide haptic feedback of null positions for any control member that is displaceable in one or more, two or more, or three degrees of freedom, including either or both of a first control member and a second control member mounted on the first control member. Furthermore, a gimbal-type sensor architecture described here can be used to advantage when the user is mobile, such as when the control member is reacted against a base or platform that is stabilized by a user carrying it in the hand not gripping the control member, or it is worn by the user on a belt or harness. The gimbal-type provides feedback of null positions with respect to a known reference frame, stabilized by the user even while moving, e.g., walking, skiing, running, driving.

Furthermore, the control signals from any of the controllers with which the gimbal-type sensors this description discloses or suggests can be further augmented by additional inputs. For example, a head or body mounted "connect sensor" can be used. This could use a grid-type infrared input or other optically based variations, such as RF directional or omnidirectional tracking. The connect sensors could be head mounted, such as for interactive virtual reality applications, or wrist mounted. "Dot" tracking can be used for more general body position inputs. The type of dot tracking can be, for example, magnetic or photogrammetric.

A controller with any one or more of these features, and their variations, can be used in applications such as flight simulation, computer aided design (CAD), drone flight, fixed wing and rotary wing flight, computer gaming, virtual and augmented reality navigation, aerial refueling, surgical robotics, terrestrial and marine robotic control, and many others.

The base may, optionally, incorporate additional user interface elements such as keys, buttons, dials, touchpads, trackpads, track balls, and displays or a bracket for holding a smartphone, tablet or other device that acts as a display. The videos or graphical images from the application being controlled can be displayed in real time on the display, such as live video from a drone, or a game can be displayed. Alternate or optional features include one or a combination of any two or more of the following features. The base could be reconfigurable for either hand with a quick disconnect for a joystick and two mounting points. The joystick may be modular to enable it to be removed and placed on other types of bases. The base could be either asymmetric or symmetric in shape, with room for secondary controls. It may include a smartphone attachment with angle adjustment capability on its top surface. It may also include a secondary joystick or other type of user interface element to allow for pan and tilt control of a drone or end-effector camera, and a capacitive or pressure dead man switch which may prevent or stop motion of the target when not engaged by a user gripping the joystick. It may also include a display mount and surface area for secondary controls. In an alternative embodiment a grip or handle can be located more midline to the controller, thus reducing some off axis moments. In other embodiments, rather than holding the base it may be stabilized by mounting the base to the user's body. Example of mounting points for a base on a user's body include a chest mount, a belt, and an article of clothing.

Examples of sensors that can be used to detect and, optionally, measure displacement include inertial measurement units, potentiometers, optical encoders, Hall effect sensors, and the like. Signals from the sensors are received by a processor, which generates control inputs that are transmitted by radio frequency, optical or wired (electrical or optical) signals. Mechanisms that allow for pivoting of control members to indicate displacement, such as gimbals, may optionally include torsion springs for centering the control member and sensors, such as potentiometers and Hall effect sensors, for measuring angular displacement. Couplings or linkages that connect the joystick to a gimbal, for example, could, in some embodiments, be made adjustable or adaptable to accommodate joysticks of different sizes for different sized users.

Examples of haptic feedback and re-centering mechanisms in addition to those described above include a spring that reacts with a spring force to provide a force feedback and active systems that sense displacement and/or force, and generate a reactive motion or force, haptic feedback, or combination of them. Vibration can be used to provide a subtle haptic feedback in one or more degrees of freedom. Force feedback could, alternatively or in addition, provide feedback in some or all degrees of freedom. Virtual reality multi-sensory integration can generate precise control within the virtual world. Integrated audio can provide sound feedback from a control target, such as a drone or other target device. The controller can also provide surface heat and cold to give feedback through a thermoelectric system or other means to trigger a thermal sensation. The user interface may, optionally, include an integrated touchscreen and visual indicators such as light, flashing colors, and so on.

Unless otherwise indicated, each control system could be adapted in alternative embodiments to allow for different degrees of freedom of displacement for each of its first and second control members. A third control member, if used, provides dynamically balanced displacement of the second control member along the Z axis, which would extend in the same general direction as a central axis of the first control member. However, in alternate embodiments, displacement of the third control member could be used as another control input and not be linked to the second control member. Many control scenarios may benefit from being able to provide rotational and translational movement using a single hand, even if fewer than all control outputs for all six degrees of freedom are required.

The embodiments described above are, unless otherwise indicated, non-limiting examples of the claimed subject matter. Variations may be made to the embodiments without departing from the scope of the claimed subject matter. One or more elements of the exemplary embodiments may be omitted, combined with, or substituted for, in whole or in part, with one or more elements of one or more of the other exemplary embodiments. Accordingly, the scope of protection is not limited to the embodiments described, but is only limited by the claims that follow, the scope of which is intended to include equivalents of the claimed subject matter.

The invention claimed is:

1. A gimbal support for a control member that pivots about each of two, intersecting axes of rotation, the gimbal support comprising:
    a base for mounting the gimbal;
    a post to which a control member of a controller may be coupled;
    a first member connected with the base in a fixed relationship; and
    a second member that rotates with respect to the first member around at least one of the two, intersecting axes of rotation, the post being coupled with the second member and constrained by the second member to pivot about each of the two, intersecting axes of rotation, the post having a null position at a predetermined angular displacement about each axis of rotation.

2. The gimbal support of claim 1, further comprising a first detent aligned with a surface feature, when the angular position of the post with respect to the first member about a first one of the axes of rotation is in a first predetermined null position, the first detent and surface feature cooperating to cause generation of haptic feedback when the post leaves and returns to the first null position, one of the first detent and the surface feature having a fixed relationship with the post and the other of the first detent and the surface feature having a fixed relationship with the first member.

3. The gimbal support of claim 2, wherein the surface feature is a recess, the surface feature being shaped to allow the first detent to extend under a biasing force, thereby interfering with the movement of the post relative to the first null position.

4. The gimbal support of claim 3, wherein the recess is a dimple shape.

5. The gimbal support of claim 2, further comprising a second detent colinear with the first detent, the first detent and the second detent cooperating to provide mechanical tactile feedback to a user at the first null position.

6. The gimbal support of claim 5, further comprising a third detent aligned with a surface area, when the angular position of the post with respect to the first member about a second one of the two axes of rotation is in a second predetermined null position, the third detent and surface feature cooperating to cause generation of haptic feedback when the post leaves and returns to the second null position, one of the third detent and the surface feature having a fixed relationship with the post and the other of the third detent and the surface feature having a fixed relationship with the first member.

7. The gimbal support of claim 6, further comprising a fourth detent colinear with the third detent, the third detent and the fourth detent cooperating to provide mechanical tactile feedback to a user at the second null position.

8. The gimbal support of claim 1, further comprising a sensor disposed to detect movement of the post relative to the base about at least one of the two axes of rotation.

9. The gimbal support of claim 8, wherein the sensor is a potentiometer, a Hall effect sensor, or an optical encoder.

10. The gimbal support of claim 7, wherein the control member is connected to the post for relative rotational movement about the axis of the post, defining a third axis of rotation.

11. A controller comprising:
    a control member configured to be gripped by a hand of a user;
    a base configured to be manipulated by the user;
    a gimbal support coupled to the control member and the base to enable movement of the control member by the user relative to the base independently about each of a first axis of rotation and a second axis of rotation, the gimbal support including:
        a first member connected with the base in a fixed relationship; and
        a second member mounted for rotation about the first axis of rotation, having a slot therein elongate along the first axis; and
    a post connected with the control member at a first, upper end and having a second, lower end disposed in the slot of the second member and mounted for pivotal movement relative to the base about the second axis, pivotal movement of the post about the second axis causing the second end of the post to translate along the slot.

12. The controller of claim 11, further comprising a sensor disposed to detect movement of the post relative to the base about at least one of the first axis or the second axis.

13. The controller of claim 12, wherein the sensor is a potentiometer, a Hall effect sensor, or an optical encoder.

14. The controller of claim 11, wherein the control member is connected to the post for relative rotational movement about the axis of the post, defining a third axis of rotation.

15. The controller of claim 11, further comprising a first detent aligned with a surface feature, when the angular position of the post with respect to the first member about the first axis is in a first predetermined null position, the first detent and surface feature cooperating to cause generation of haptic feedback when the post leaves and returns to the first null position, one of the first detent and the surface feature having a fixed relationship with the post and the other of the first detent and the surface feature having a fixed relationship with the first member.

16. The controller of claim 15, wherein the surface feature is a recess, the surface feature being shaped to allow the first detent to extend under a biasing force, thereby interfering with the movement of the post relative to the first null position.

17. The controller of claim 16, wherein the recess is a dimple shape.

18. The controller of claim 15, further comprising a second detent colinear with the first detent, the first detent and the second detent cooperating to provide mechanical tactile feedback to a user at the first null position.

19. The controller of claim 18, further comprising a third detent aligned with a surface feature, when the angular position of the post with respect to the first member about the second axis is in a second predetermined null position, the third detent and surface feature cooperating to cause generation of haptic feedback when the post leaves and returns to the second null position, one of the third detent and the surface feature having a fixed relationship with the post and the other of the third detent and the surface feature having a fixed relationship with the first member.

20. The controller of claim 19, further comprising a fourth detent colinear with the third detent, the third detent and the fourth detent cooperating to provide mechanical tactile feedback to a user at the second null position.

21. The controller of claim 14, further comprising a centering spring disposed along the third axis and configured to bias the post to a third predetermined null position.

\* \* \* \* \*